United States Patent
O'Sullivan et al.

(10) Patent No.: US 10,424,939 B2
(45) Date of Patent: Sep. 24, 2019

(54) CURRENT LIMIT CONTROL IN HOT SWAP CONTROLLERS

(71) Applicant: Analog Devices Global, Hamilton (BM)

(72) Inventors: Marcus O'Sullivan, San Jose, CA (US); Aldo Togneri, Midlothian (GB)

(73) Assignee: Analog Devices Global, Hamilton (BM)

( * ) Notice: Subject to any disclaimer, the term of this patent is extended or adjusted under 35 U.S.C. 154(b) by 574 days.

(21) Appl. No.: 15/061,251

(22) Filed: Mar. 4, 2016

(65) Prior Publication Data

US 2017/0256954 A1 Sep. 7, 2017

(51) Int. Cl.
*H02J 4/00* (2006.01)
*H02M 3/155* (2006.01)
*H02J 7/00* (2006.01)

(52) U.S. Cl.
CPC ............ *H02J 4/00* (2013.01); *H02J 7/008* (2013.01); *H02M 3/155* (2013.01)

(58) Field of Classification Search
None
See application file for complete search history.

(56) References Cited

U.S. PATENT DOCUMENTS

| | | | | |
|---|---|---|---|---|
| 6,304,039 B1 * | 10/2001 | Appelberg | ............. | H05B 33/08 315/169.3 |
| 6,320,283 B1 * | 11/2001 | Salim | ..................... | H02H 3/087 307/125 |
| 6,917,504 B2 | 7/2005 | Nguyen et al. | | |
| 8,064,180 B1 | 11/2011 | Sherwin | | |
| 9,467,136 B1 * | 10/2016 | Nguyen | ............. | H03K 17/0822 |
| 2015/0241891 A1 | 8/2015 | Lee | | |
| 2016/0182039 A1 * | 6/2016 | Xiao | ...................... | H03K 17/18 307/115 |

FOREIGN PATENT DOCUMENTS

| | | |
|---|---|---|
| CN | 101809852 | 8/2010 |
| CN | 103107684 | 5/2013 |
| CN | 104600813 | 5/2015 |
| CN | 201178504 | 1/2019 |

OTHER PUBLICATIONS

"Chinese Application Serial No. 201710123312.5, Office Action dated Mar. 5, 2018", 11 pgs.

* cited by examiner

*Primary Examiner* — Ronald W Leja
*Assistant Examiner* — David M Stables
(74) *Attorney, Agent, or Firm* — Schwegman Lundberg & Woessner, P.A.

(57) ABSTRACT

In an example, a device for controlling an electronic switch between a power supply and a load includes a first device pin configured to be in communication with the electronic switch, a sensing circuit configured to be connected to an input voltage and to measure a current to the load, a control circuit configured to be in communication with the sensing circuit and the electronic switch, the control circuit configured to use a current limit signal to control operation of the electronic switch, and a current limit circuit configured to be in communication with the control circuit, the current limit circuit configured to generate the current limit signal representing a current limit and automatically adjust the current limit signal in response to a change in at least one of the input voltage and an output voltage.

17 Claims, 3 Drawing Sheets

CURRENT LIMIT CONTROL IN HOT SWAP CONTROLLERS

TECHNICAL FIELD

This disclosure relates generally to a connection device for enabling power to be supplied to an electrical load.

BACKGROUND

There are instances when it is desired to connect an electrical load to a power supply that is already on. This can give rise to large in-rush currents as capacitive components of the load charge up. Such capacitive components may be real or parasitic components.

These in-rush currents can perturb the operation of the power supply, possibly causing protective measures within the power supply to trip. Furthermore, the in-rush currents may introduce perturbations in the power supplied to other loads connected to the power supply, and these perturbations may affect the operation of those circuits. In addition, if the newly introduced load is faulty, its fault may also affect the operation of the power supply and the other loads or circuits connected to the supply.

In order to address these issues, it is known to provide "hot swap" circuits that regulate the current flow to a load that is newly introduced to a power supply.

OVERVIEW

In some examples, this disclosure is directed to a device for controlling an electronic switch between a power supply and a load. The device comprises a first device pin configured to be in communication with the electronic switch, a sensing circuit configured to be connected to an input voltage and to measure a current to the load, a control circuit configured to be in communication with the sensing circuit and the electronic switch, the control circuit configured to use a current limit signal to control operation of the electronic switch, and a current limit circuit configured to be in communication with the control circuit, the current limit circuit configured to generate the current limit signal representing a current limit and automatically adjust the current limit signal in response to a change in at least one of the input voltage and an output voltage.

In some examples, this disclosure is directed to a method for controlling an electronic switch between a power supply and a load. The method comprises measuring a current to the load, generating a current limit signal representing a current limit, automatically adjusting the current limit signal in response to a change in at least one of an input voltage and an output voltage, and controlling operation of the electronic switch using the current limit signal.

In some examples, this disclosure is directed to a circuit for controlling an electronic switch between a power supply and a load. The circuit comprises a first node configured to be in communication with the electronic switch, a sensing circuit configured to be connected to an input voltage and to measure a current to the load, a control circuit configured to be in communication with the sensing circuit and the electronic switch, the control circuit configured to use a current limit signal to control operation of the electronic switch, and a current limit circuit configured to be in communication with the control circuit, the current limit circuit configured to generate the current limit signal representing a current limit and automatically adjust the current limit signal in response to a change in at least one of the input voltage and an output voltage.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
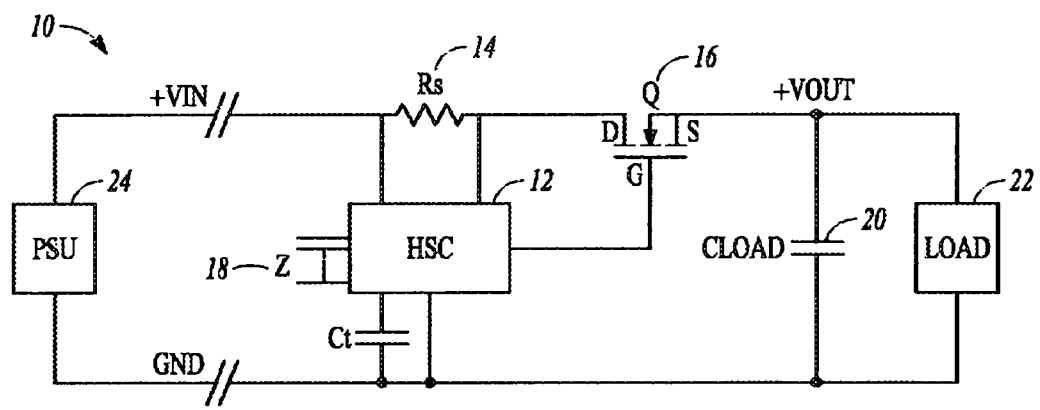
FIG. 1 is an example of an existing hot swap circuit.

FIG. 1 is an example of a block diagram of an existing hot swap circuit. A hot swap circuit 10 can include a hot swap controller 12 (HSC), a current sense element 14 ($R_S$), an electronic switch 16 (Q), e.g., field effect transistor, along with a number of discrete components 18 (Z).

The main function of the hot swap controller 12 can be to detect the current in the sense element 14 and control the electronic switch 16 to ensure that the current does not exceed the system limits and/or the safe operating limits of the switch. The latter is typically achieved using a timer function that limits the amount of time the system can remain in current limit. At the output of the hot swap circuit 10, there is usually a significant amount of load capacitance 20 (CLOAD).

The controller 12 can apply a control signal to the electronic switch 16, e.g., to a gate of the FET 16, in order to enable current flow to the load 22. The controller 12 can monitor the voltage occurring across the current sensing resistor 14 and, in a closed loop, can control the electronic switch 16, e.g., the gate voltage of the FET 16, such that the rate of change of current (dI/dt) is controlled to a target value, the magnitude of the current is controlled to a target value, or the output voltage ramp is controlled to a target value. This can prevent excessive in-rush currents being drawn by the load 22. The load 22 can be assumed to be fully powered when it is no longer possible to get the rate of current increase or the current to attain the target value.

The hot swap circuit 10 generally resides on a point of power entry to a system. Its primary function is to protect the power source, hardware components (PCB, FETs, etc.) and the entire system from damage and disturbance during fault conditions. Some of the primary protection functions can include controlling power-ups e.g., limiting inrush current, detecting over current events and interrupting them, and controlling the dV/dt of the output voltage ramp.

There are typically two relevant current limits: the normal current limit is generally referred to as a circuit breaker (ILIM) and there is also a fast acting higher current limit referred to as Severe Over Current (ISOC). If the current exceeds the main current limit (ILIM) the timer function can run and typically latch off the electronic switch, e.g., MOSFET, FET, etc. once expired. If the over current happens very suddenly with large current demand, such as a low impedance short circuit, the fast acting threshold at the higher current limit threshold (ISOC) can trigger an immediate shutdown of the electronic switch, e.g., MOSFET, FET, etc. However, this function is usually not latched and can be followed by a recovery attempt. This can allow a system to regain control of the load current and attempt a recovery. If the fault is still present it can then reach a current limit and timeout accordingly, thereby shutting down the electronic switch, e.g., MOSFET. However, if the fault is no longer present, then the system may recover and power back up if conditions allow.

Hot swap controllers are usually designed to protect from faults, etc. at the load side of the circuit (output). However, systems can also experience power line disturbances (input). Examples of such disturbances can include voltage steps on the main power line, transient voltage glitches, and surges. When a typical hot swap circuit is subjected to these disturbances, the sudden increase in input supply voltage can result in a large inrush current into the load capacitance 20 (CLOAD). This current can attempt to flow through the sense element 14 and the electronic switch 16, e.g., metal-oxide-semiconductor field-effect transistor or "MOSFET". However, due to the fast slew rate of the input voltage ramp, this inrush event can present as a Severe Over Current (ISOC) fault and force the HSC to shut down the electronic switch immediately.

Next, the hot swap controller 12 can attempt to recover by once again ramping up a control signal to the electronic switch 16, e.g., ramping up the gate voltage to a MOSFET, to re-enable the supply current to the load 22. At this point, there can be a system load still demanding current in normal operation, but the electronic switch 16 is disabled. So, the energy to keep the system powered is being drained from CLOAD. The system can try to recover the supply voltage as fast as possible to prevent the voltage on CLOAD from falling below the operating voltage of the system. However, many systems use MOSFETS that are driven from the hot swap controller 12 using a high impedance driver, which can often take too long to recover the gate voltage sufficiently to allow conduction in the MOSFET. If this is allowed to happen, then the system can reset, which can be undesirable.

In many systems, the operating voltage may have a wide input range. A specific example for illustration purposes may be a 48V system. The acceptable operating range of the system may be from 40V to 60V. The power supply unit (PSU) 24 can generally be rated to a maximum power limit in Watts. Also, on similar medium to high voltage systems, on the load side of the hot swap controller 12 there may be a single power converter (load 22) and also rated in Watts.

The power supply 24, if rated at 1000 W, can be capable of supplying about 20.8 A at 48V. But at 60V, the available current is limited to about 16.6 A. In contrast, at 40V, the power supply 24 can deliver 25 A. The power converters at the load 22 can also demand varying currents depending on the input voltage.

Using a fixed current limit device as protection, such as a typical hot swap controller, can mean that the device should be rated to deliver the maximum required current. In the 1000 W example above, the maximum required current is 25 A. However, this means that if the input voltages increases to 60V, the current limit will remain at 25 A and allow up to 1500 W of load to be demanded, which would exceed the power supply power limit of 1000 W.

In addition, the transistor 16, e.g., FET, should be rated to protect against a worst case condition of 25 A at 60V. However, the load 22 will not require more than about 16.6 A at 60V in this example.

In sum, existing systems typically can use a power supply 24 with a power limit and a load 22, e.g., power converter, with a power limit, but use a hot swap controller 12 with a fixed current limit between the power supply 24 and the load 22. This typical design can involve considerable system overdesign, including in transistor safe operating area (SOA) requirements.

In accordance with various techniques of this disclosure, a solution to using a fixed current limit device as protection can be to dynamically and automatically adjust the current limit as the input (or output) voltage changes, as described in detail below with respect to FIG. 2. If the voltage increases, the current limit can be decreased, and as the voltage decreases, the current limit can be increased. Various techniques described below can reduce the amount of overdesign of current systems. Reducing the amount of overdesign can allow designers more choices in transistors, e.g., FETs, power trains, sense resistors, input connectors, etc.

Figure 2:
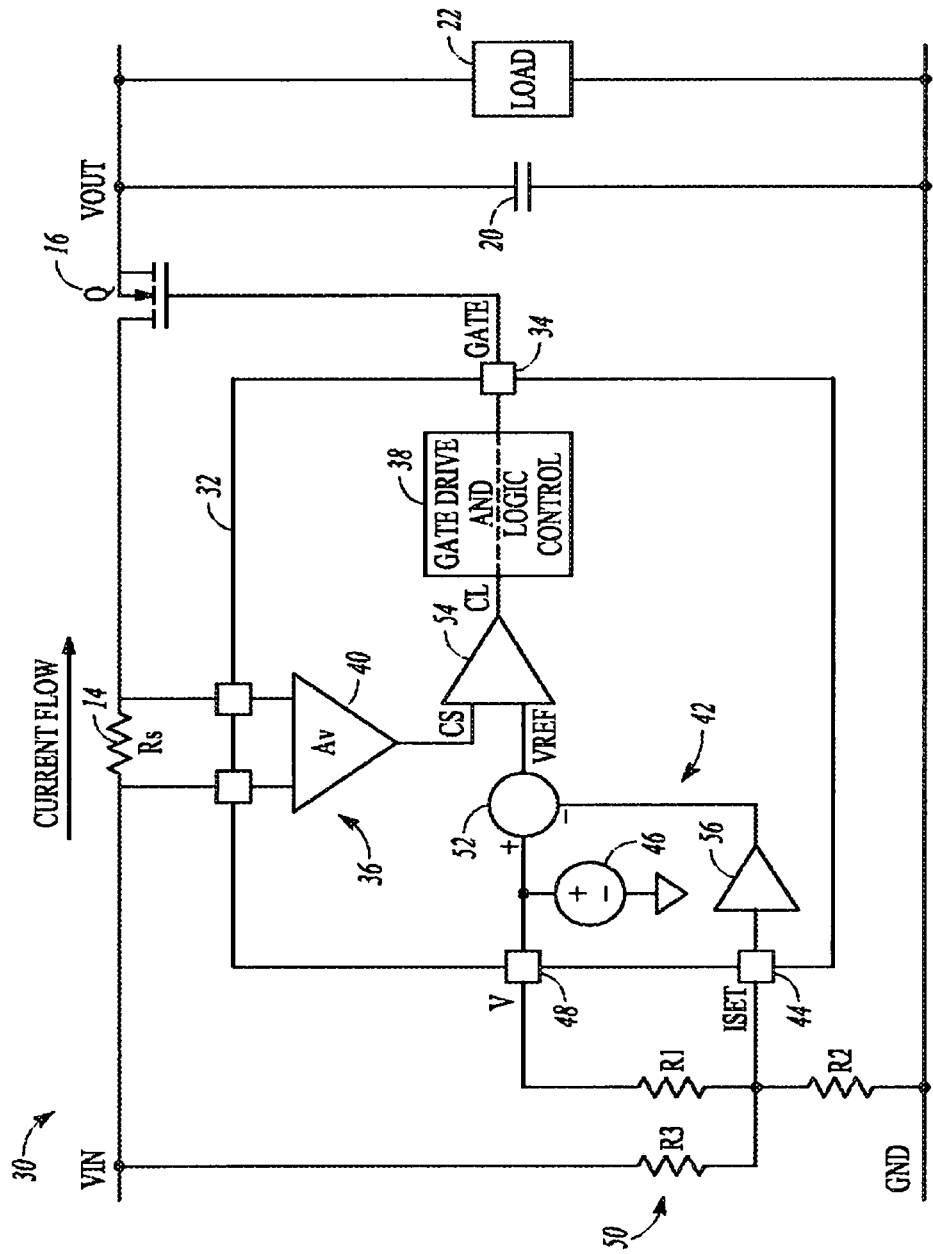
FIG. 2 is an example of a block diagram of a hot swap circuit, in accordance with this disclosure.

FIG. 2 is an example of a block diagram of a hot swap circuit 30, in accordance with this disclosure. The hot swap circuit 30 can include a hot swap controller 32, a current sense element 14 ($R_S$), and an electronic switch 16 (Q), e.g., field effect transistor, along with a number of discrete components 18 (Z). The circuit 30 can include a node, e.g., a device pin 34, configured to be in communication with the electronic switch 16. In some examples, the node can be in communication with a terminal of the electronic switch 16, e.g., a gate terminal of a transistor.

The current sense element 14 can be part of a sensing circuit, shown generally at 36. The sensing circuit 16 can be configured to be connected to an input voltage, e.g., VIN, and to measure a current to the load 22.

The hot swap circuit 30 can include a control circuit 38 configured to be in communication with the sensing circuit 36 and the electronic switch 16. As described above with respect to FIG. 1, the controller 32 can apply a control signal to the electronic switch 16, e.g., to a gate of a FET, in order to enable current flow to the load 22. The controller 32 can monitor the voltage across the current sensing resistor 14 and, in a closed loop, can control the electronic switch 16, e.g., the gate voltage of a FET, such that the rate of change of current (dI/dt) is controlled to a target value, the magnitude of the current is controlled to a target value, or the output voltage ramp is controlled to a target value. More particularly, the control circuit 38 can be configured to use a current limit signal CL to control operation of the electronic switch 16, e.g., a transistor, such as a FET.

In some examples, the sensing circuit 36 can be configured to output a voltage CS proportional to the current measured across the sense resistor 14. The sense voltage across the current sense element 14 can be amplified using voltage amplifier 40.

In addition, the hot swap circuit 30 can include a current limit circuit, shown generally at 42, configured to be in communication with the control circuit 38. The current limit circuit can be configured to generate the current limit signal CL representing a current limit and automatically adjust the current limit signal CL in response to a change in at least one of the input voltage VIN and an output voltage VOUT. In this manner and in accordance with this disclosure, the current limit circuit 42 can allow the hot swap circuit 30 to dynamically and automatically adjust the current limit as the input (or output) voltage changes.

The current limit circuit 42 can generate a reference voltage VREF that automatically adjusts in response to the change in at least one of the input voltage and the output voltage, compare the voltage proportional to the measured current, e.g., voltage CS, to the automatically adjusting reference voltage VREF, and output the current limit signal CL to the control circuit 38 using the comparison.

For example, as seen in FIG. 2, the hot swap controller 32 can include a second node or device pin 44 ("ISET"). The current limit circuit 42 can be communication with a fixed reference voltage source configured to generate a fixed reference voltage. The fixed reference voltage source can be internal to the controller 32, as shown at 46, e.g., a low dropout regulator (LDO), or external to the controller 32 and connected to the controller 32, e.g., using a node or pin 48 ("V").

The current limit circuit 42 can be communication with a resistive network 50 configured to be connected to the second device pin 44, the fixed reference voltage source 46, and the input voltage VIN. The resistive network 50 can include one or more resistors, e.g., R1-R3, and be configured to set a current limit voltage on the second device pin 44.

In addition, the hot swap controller 32 can include an arithmetic circuit 52 in communication with the second device pin 44. In some examples, the arithmetic circuit 52, e.g., an operational amplifier, can be configured to subtract the current limit voltage, e.g., at node or device pin 44, from the fixed reference voltage, e.g., at node or pin 48, to generate the reference voltage VREF that can automatically adjust in response to the change in at least one of the input voltage and the output voltage. As seen in FIG. 2, the voltage CS, which can be proportional to the measured current at sense resistor 14, and the automatically adjusting reference voltage VREF, can be compared using a comparator 54, for example. The comparator 54 can output the current limit signal CL to the control circuit 38 using the comparison.

In some examples, the comparator 54 can output a digital current limit signal CL, e.g., a binary output. In other examples, the comparator 54 can output an analog current limit signal CL.

In some example configurations, the current limit circuit 42 can include a buffer 56 in communication with the second device pin 44 ("ISET") and the arithmetic circuit 52. The buffer can be configured to reduce current flow into the node or device pin 44.

By way of a specific non-limiting example, the resistive network 50 can include resistors R1, R2, and R3 as shown in FIG. 2, where the voltage ISET can be generated from the fixed voltage V at node or pin 48 using resistors R1 and R2, but adjusted using resistor R3. The resistor R3 can cause the voltage ISET to increase and decrease based on the input voltage VIN. Because the voltage V on pin 48 can be fixed, if the input voltage VIN increases, it can pull the voltage ISET at pin 44 closer to voltage V at pin 48, which can reduce the current limit signal CL, which represents the current limit of the controller 32. In this manner, the current limit circuit 42 can allow the hot swap circuit 30 to automatically adjust the current limit as the input voltage changes.

As mentioned above, in some examples, the current limit circuit 42 can be configured to generate the current limit signal CL representing a current limit and automatically adjust the current limit signal CL in response to a change the output voltage VOUT. In such a configuration, the device pin 44 can be in communication with the output voltage VOUT, e.g., via a resistor, instead of being connected to the input voltage VIN via R3 as is depicted in FIG. 2. Because the voltage V on pin 48 can be fixed, if the output voltage VOUT increases, it can pull the voltage ISET at pin 44 closer to voltage V at pin 48, which can reduce the current limit signal CL, which represents the current limit of the controller 32. In this manner, the current limit circuit 42 can allow the hot swap circuit 30 to automatically adjust the current limit as the output voltage changes.

It should be noted that the techniques described above are not limited to controlling a single electronic switch, e.g., FET, but can be used for controlling more than one electronic switch, e.g., two or more FETs. By way of a specific, non-limiting example, three FETs can be configured such that their 3 drains are connected together, their 3 sources are connected together, and each of the 3 gates can each be connected to a respective resistor that are then connected to a hot swap controller, e.g., hot swap controller 32 of FIG. 2.

Figure 3:
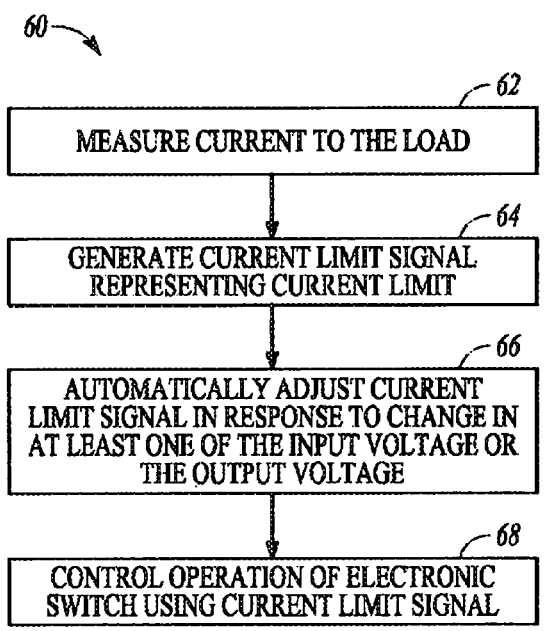
FIG. 3 is a flow diagram of an example of a method for automatically adjusting a current limit in a hot swap controller, in accordance with this disclosure.

FIG. 3 is a flow diagram of an example of a method 60 for automatically adjusting a current limit in a hot swap controller, in accordance with this disclosure. As seen in FIG. 3, the method 60 can include measuring a current to the load, e.g., using a sensing circuit, such as the sensing circuit 36 of FIG. 2 (block 62). At block 64, the method can include generating a current limit signal (e.g., CL in FIG. 2) representing a current limit, e.g., using a current limit circuit, such the current limit circuit 42 of FIG. 2. At block 66, the method can include automatically adjusting the current limit signal (e.g., CL in FIG. 2) in response to a change in at least one of an input voltage and an output voltage. At block 68, the method can include controlling operation of the electronic switch using the current limit signal, e.g., adjusting a voltage on a terminal of a transistor.

In some examples, the method 60 of FIG. 3 can include generating a reference voltage that automatically adjusts in response to the change in at least one of the input voltage and the output voltage, comparing the voltage proportional to the current to the load to the automatically adjusting reference voltage, and outputting the current limit signal to the control circuit using the comparison.

The method 60 of FIG. 3 can include setting a fixed reference voltage, setting a current limit voltage, and subtracting the current limit voltage from the fixed reference voltage to generate the reference voltage that automatically adjusts in response to the change in at least one of the input voltage and the output voltage.

VARIOUS EXAMPLES AND NOTES

Example 1 includes subject matter (such as a device, apparatus, or machine) for controlling an electronic switch between a power supply and a load, the device comprising: a first device pin configured to be in communication with the electronic switch; a sensing circuit configured to be connected to an input voltage and to measure a current to the load; a control circuit configured to be in communication with the sensing circuit and the electronic switch, the control circuit configured to use a current limit signal to control operation of the electronic switch; and a current limit circuit configured to be in communication with the control circuit, the current limit circuit configured to generate the current limit signal representing a current limit and automatically adjust the current limit signal in response to a change in at least one of the input voltage and an output voltage.

In Example 2, the subject matter of Example 1 can optionally include, wherein the sensing circuit is configured to output a voltage proportional to the measured current, and wherein the current limit circuit configured to generate the current limit signal representing a current limit and automatically adjust the current limit signal in response to a change in at least one of the input voltage and an output voltage is configured to: generate a reference voltage that automatically adjusts in response to the change in at least one of the input voltage and the output voltage; compare the voltage proportional to the measured current to the automatically adjusting reference voltage; and output the current limit signal to the control circuit using the comparison.

In Example 3, the subject matter of Example 2 may optionally include, a second device pin, wherein the current limit circuit configured to generate a reference voltage that automatically adjusts in response to the change in at least one of the input voltage and the output voltage is configured to be in communication with: a fixed reference voltage source; a resistive network configured to be connected to the second device pin, the fixed reference voltage source, and the input voltage, wherein the resistive network is configured to set a current limit voltage on the second device pin; and an arithmetic circuit in communication with the second device pin, the arithmetic circuit configured to subtract the current limit voltage from the fixed reference voltage to generate the reference voltage that automatically adjusts in response to the change in at least one of the input voltage and the output voltage.

In Example 4, the subject matter of Example 3 may optionally include, a third device pin, wherein the fixed reference voltage source is connected to the third device pin.

In Example 5, the subject matter of Example 3 may optionally include, wherein the fixed reference voltage source is external or internal to the device.

In Example 6, the subject matter of one or more of Examples 3-5 may optionally include, wherein the resistive network is external or internal to the device.

In Example 7, the subject matter of one or more of Examples 3-6 may optionally include, wherein the arithmetic circuit comprises at least one operational amplifier.

In Example 8, the subject matter of one or more of Examples 3-7 may optionally include, a buffer in communication with the second device pin and the arithmetic circuit, the buffer configured to reduce current flow into the third device pin.

In Example 9, the subject matter of one or more of Example 1-8 may optionally include, wherein the electronic switch comprises a plurality of electronic switches.

Example 10 includes subject matter (such as a method, means for performing acts, machine readable medium including instructions that when performed by a machine cause the machine to performs acts, or an apparatus configured to perform) for controlling an electronic switch between a power supply and a load, the device comprising: measuring a current to the load; generating a current limit signal representing a current limit; automatically adjusting the current limit signal in response to a change in at least one of an input voltage and an output voltage; and controlling operation of the electronic switch using the current limit signal.

In Example 11, the subject matter of Example 10 may optionally include, wherein generating a current limit signal representing a current limit and automatically adjusting the current limit signal in response to a change in at least one of an input voltage and an output voltage comprises: generating a reference voltage that automatically adjusts in response to the change in at least one of the input voltage and the output voltage; comparing the voltage proportional to the current to the load to the automatically adjusting reference voltage; and outputting the current limit signal to the control circuit using the comparison.

In Example 12, the subject matter of Example 11 may optionally include, wherein generating a reference voltage that automatically adjusts in response to the change in at least one of the input voltage and the output voltage comprises: setting a fixed reference voltage; setting a current limit voltage; and subtracting the current limit voltage from the fixed reference voltage to generate the reference voltage that automatically adjusts in response to the change in at least one of the input voltage and the output voltage.

In Example 13, the subject matter of Example 12 may optionally include, wherein setting a current limit comprises: setting the current limit voltage on the second device pin using a resistive network configured to be connected to the first device pin, the second device pin, and the input voltage.

In Example 14, the subject matter of Example 12 may optionally include, wherein setting a fixed reference voltage on a first device pin comprises: setting the fixed reference voltage on a first device pin of the device using a fixed reference voltage source configured to be connected to the first device pin.

In Example 15, the subject matter of one or more of Examples 11-14 may optionally include, wherein the electronic switch comprises a plurality of electronic switches.

In Example 16, the subject matter of one or more of Examples 12-15 may optionally include, wherein subtracting the current limit voltage on the second device pin from the fixed reference voltage on the first device pin to generate the reference voltage that automatically adjusts in response to the change in at least one of the input voltage and the output voltage comprises: configuring an operational amplifier to subtract the current limit voltage on the second device pin from the fixed reference voltage on the first device pin to generate the reference voltage that automatically adjusts in response to the change in at least one of the input voltage and the output voltage.

In Example 17, the subject matter of one or more of Examples 10-16 may optionally include, wherein controlling operation of the electronic switch using the current limit signal comprises: adjusting a voltage on a terminal of a transistor.

Example 18 includes subject matter (such as a circuit) for controlling an electronic switch between a power supply and a load, the circuit comprising: a first node configured to be in communication with the electronic switch; a sensing circuit configured to be connected to an input voltage and to measure a current to the load; a control circuit configured to be in communication with the sensing circuit and the electronic switch, the control circuit configured to use a current limit signal to control operation of the electronic switch; and a current limit circuit configured to be in communication with the control circuit, the current limit circuit configured to generate the current limit signal representing a current limit and automatically adjust the current limit signal in response to a change in at least one of the input voltage and an output voltage.

In Example 19, the subject matter of Example 18 may optionally include, wherein the sensing circuit is configured to output a voltage proportional to the measured current, and wherein the current limit circuit configured to generate the current limit signal representing a current limit and automatically adjust the current limit signal in response to a change in at least one of the input voltage and an output voltage is configured to: generate a reference voltage that automatically adjusts in response to the change in at least one of the input voltage and the output voltage; compare the voltage proportional to the measured current to the automatically adjusting reference voltage; and output the current limit signal to the control circuit using the comparison.

In Example 20, the subject matter of Example 19 may optionally include, a second node, wherein the current limit circuit configured to generate a reference voltage that automatically adjusts in response to the change in at least one of the input voltage and the output voltage is configured to be in communication with: a fixed reference voltage source; a resistive network configured to be connected to the second node, the fixed reference voltage source, and the input voltage, wherein the resistive network is configured to set a current limit voltage on the second node; and an arithmetic circuit in communication with the second node, the arithmetic circuit configured to subtract the current limit voltage from the fixed reference voltage to generate the reference voltage that automatically adjusts in response to the change in at least one of the input voltage and the output voltage.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A device configured to automatically adjust a current limit and to control an electronic switch between a power supply configured to generate an input voltage and to supply an output voltage to a load, the device comprising:
 a current limit circuit configured to generate a current limit signal and automatically adjust the current limit signal using:
  a voltage proportional to a current to the load measured by a sensing circuit; and
  at least one of the input voltage and the output voltage;
 the current limit circuit including:
  a fixed reference voltage source configured to be coupled to a resistive network, wherein the resistive network is configured to set a current limit voltage; and
  an arithmetic circuit configured to use the current limit voltage and the fixed reference voltage source to generate a reference voltage that automatically adjusts in response to a change in at least one of the input voltage and the output voltage; and
 a control circuit coupled to the electronic switch and configured to receive the current limit signal and control operation of the electronic switch using the current limit signal.

2. The device of claim 1, the device further comprising:
 a comparator circuit configured to:
 compare the voltage proportional to the measured current to the automatically adjusting reference voltage; and
 output the current limit signal to the control circuit using the comparison.

3. The device of claim 2,
 wherein the current limit signal output by the comparator circuit is a digital current limit signal.

4. The device of claim 1, wherein the fixed reference voltage source includes a low dropout regulator.

5. The device of claim 1, wherein the resistive network is external or internal to the device.

6. The device of claim 1, wherein the arithmetic circuit comprises at least one operational amplifier.

7. The device of claim 1, comprising:
a buffer coupled to the arithmetic circuit, the buffer configured to reduce current flow into the device.

8. The device of claim 1, wherein the electronic switch comprises a plurality of electronic switches.

9. A method to automatically adjust a current limit and to control an electronic switch between a power supply configured to generate an input voltage and to supply an output voltage to a load, the method comprising:
measuring a current to the load and generating a voltage proportional to the measured current;
generating a current limit signal representing a current limit using:
the voltage proportional to the measured current; and
at least one of an input voltage and an output voltage;
setting a current limit voltage;
generating a reference voltage that automatically adjusts in response to the change in at least one of the input voltage and the output voltage by using the current limit voltage and a fixed reference voltage source; and
controlling operation of the electronic switch using the current limit signal.

10. The method of claim 9, further comprising:
automatically adjusting the current limit signal in response to a change in at least one of the input voltage and an output voltage.

11. The method of claim 9, wherein the fixed reference voltage source comprises
a low dropout regulator.

12. The method of claim 9, wherein generating a reference voltage that automatically adjusts in response to the change in at least one of the input voltage and the output voltage by using the current limit voltage and a fixed reference voltage source includes:
configuring an operational amplifier to use the current limit voltage and the fixed reference voltage to generate the reference voltage that automatically adjusts in response to the change in at least one of the input voltage and the output voltage.

13. The method of claim 9, wherein controlling operation of the electronic switch using the current limit signal comprises:
adjusting a voltage on a terminal of a transistor.

14. The method of claim 9, further comprising:
comparing the voltage proportional to the current to the load to the automatically adjusting reference voltage; and
outputting the current limit signal to the control circuit using the comparison.

15. The method of claim 14, wherein outputting the current limit signal includes outputting a digital current limit signal.

16. A device configured to automatically adjust a current limit and to control an electronic switch between a power supply configured to generate an input voltage and to supply an output voltage to a load, the device comprising:
means for measuring a current to the load and generating a voltage proportional to the measured current;
means for generating a current limit signal representing a current limit using:
the voltage proportional to the measured current; and
at least one of an input voltage and an output voltage; and
means for setting a current limit voltage;
means for generating a reference voltage that automatically adjusts in response to the change in at least one of the input voltage and the output voltage by using the current limit voltage and a fixed reference voltage source; and
means for controlling operation of the electronic switch using the current limit signal.

17. The device of claim 16, further comprising:
means for comparing the voltage proportional to the current to the load to the automatically adjusting reference voltage; and
means for outputting the current limit signal to a control circuit using the comparison.

* * * * *